United States Patent
Gueron et al.

(10) Patent No.: US 8,600,049 B2
(45) Date of Patent: *Dec. 3, 2013

(54) METHOD AND APPARATUS FOR OPTIMIZING ADVANCED ENCRYPTION STANDARD (AES) ENCRYPTION AND DECRYPTION IN PARALLEL MODES OF OPERATION

(75) Inventors: Shay Gueron, Haifa (IL); Amit Gradstein, Binyamina (IL); Zeev Sperber, Zichron Yackov (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/506,701

(22) Filed: May 10, 2012

(65) Prior Publication Data

US 2012/0224687 A1 Sep. 6, 2012

Related U.S. Application Data

(63) Continuation of application No. 12/038,071, filed on Feb. 27, 2008, now Pat. No. 8,194,854.

(51) Int. Cl.
H04L 9/00 (2006.01)
(52) U.S. Cl.
USPC .............................. 380/28; 380/29
(58) Field of Classification Search
USPC ............... 380/28–29; 713/189–190
See application file for complete search history.

(56) References Cited

U.S. PATENT DOCUMENTS

| 7,688,974 | B2 | 3/2010 | Lee et al. | |
|---|---|---|---|---|
| 7,697,681 | B2* | 4/2010 | Leech | 380/28 |
| 8,036,377 | B1* | 10/2011 | Poo et al. | 380/28 |
| 8,107,621 | B2* | 1/2012 | Celikkan et al. | 380/28 |
| 8,194,854 | B2 | 6/2012 | Gueron et al. | |
| 2001/0021254 | A1 | 9/2001 | Furuya et al. | |
| 2003/0091036 | A1 | 5/2003 | Milliken et al. | |
| 2004/0202317 | A1 | 10/2004 | Demjanenko et al. | |
| 2007/0098153 | A1 | 5/2007 | Nishikawa | |
| 2007/0237324 | A1 | 10/2007 | Ferguson et al. | |
| 2009/0096481 | A1 | 4/2009 | Butter | |

FOREIGN PATENT DOCUMENTS

| CN | 101114903 A | 1/2008 |
|---|---|---|
| WO | 2006/112114 A1 | 10/2006 |
| WO | 2007/060587 A1 | 5/2007 |

OTHER PUBLICATIONS

Elbirt, et al., "An FPGA-Based Performance Evaluation of the AES Block Cipher Candidate Algorithm Finalists", IEEE Transactions On Very Large Scale Integration (VLSI) Systems, Aug. 2001, pp. 545-557, vol. 9, No. 4, IEEE Service Center, Piscataway, NJ, USA.
Office Action for Chinese Patent Application No. 200910008397.8, Mailed on Jul. 11, 2012, 14 pages of office action including 9 pages of English translation.
Office Action for European Patent Application No. 09250544.5, Mailed on Jul. 18, 2012, 5 pages of office action.

(Continued)

*Primary Examiner* — Hosuk Song
(74) *Attorney, Agent, or Firm* — L. Cho (57) ABSTRACT

The throughput of an encryption/decryption operation is increased in a system having a pipelined execution unit. Different independent encryptions (decryptions) of different data blocks may be performed in parallel by dispatching an AES round instruction in every cycle.

20 Claims, 4 Drawing Sheets

(56) References Cited

OTHER PUBLICATIONS

Office Action for Japanese Patent Application No. 2009-043695, Mailed on Sep. 27, 2011, 7 pages of office Action including 3 pages of English translation.

Gueron, "Intel's New AES Instructions for Enhanced Performance and Security", LNCS, Fast Software Encryption, Feb. 2009, vol. 5665, pp. 51-68.

Yoo, et al., "An AES crypto chip using a high-speed parallel pipelined architecture", Elsevier, Microprocrssors and Microsystems, Jan. 7, 2005, vol. 29, Issue 7, pp. 317-326.

Satoh, et al., "A Compact Rijndael Hardware Architecture with S-Box Optimization", LNCS, Advances in Cryptology—ASIACRYPT, Dec. 2001, vol. 2248, pp. 239-254.

Brickell, et al., "Software mitigations to hedge AES against cache-based software side channel vulnerabilities", Cryptology ePrint Archive, Report 2006/052, Feb. 2006, 17 pages.

Bielecki, et al., "Parallelization of the AES Algorithm", Proceedings of the 4th WSEAS International Conference on Information Security, Communications and Computers, Dec. 16-18, 2005, pp. 224-228.

Office Action for European Patent Application No. 09250544.5, Mailed on Sep. 5, 2011, 6 pages.

European Search Report for European Patent Application No. 09250544.5, Mailed on Nov. 3, 2010, 5 pages.

Daemen, et al., "Preliminaries of The Design of Rijndael", Information Security and Cyptography, Springer, Jan. 1, 2002, pp. 9-29.

Wikipedia, "Pipeline (computing)", Nov. 13, 2007, 3 pages.

Liberatori, et al., "AES-128 cipher, Minimum area, low cost FPGA implementation", Latin American applied research, Jan. 1, 2007, vol. 37, Issue No. 1, pp. 71-77.

Office Action for Chinese Patent Application No. 200910008397.8, Mailed on Mar. 25, 2010, 6 pages.

Office Action for Chinese Patent Application No. 200910008397.8, Mailed on Nov. 16, 2010, 15 pages of office Action including 11 pages of English translation.

Office Action for Korean Patent Application No. 10-2009-17289, Mailed on Oct. 26, 2010, 8 pages of office Action including 4 pages of English translation.

Menezes, et al., "Chapter 7" Block Ciphers from the "Handbook of Applied Cryptography", CRC Press, Inc, 1997, 61pages.

\* cited by examiner

| CYCLE # | 1 | 2 | 3 | 4 | 5 | 6 | 7 | 8 | 9 | 10 | 11 | 12 |
|---|---|---|---|---|---|---|---|---|---|---|---|---|
| Xmm1 | * | * | * | * | * | * | | | | | | |
| Xmm2 | | * | * | * | * | * | * | | | | | |
| Xmm3 | | | * | * | * | * | * | * | | | | |
| Xmm4 | | | | * | * | * | * | * | * | | | |
| Xmm5 | | | | | * | * | * | * | * | * | | |
| Xmm6 | | | | | | * | * | * | * | * | * | |
| Xmm1 | | | | | | | * | * | * | * | * | * |

FIG. 4

METHOD AND APPARATUS FOR OPTIMIZING ADVANCED ENCRYPTION STANDARD (AES) ENCRYPTION AND DECRYPTION IN PARALLEL MODES OF OPERATION

RELATED APPLICATION

This application is a continuation of and claims priority and benefit to U.S. application Ser. No. 12/038,071, filed on Feb. 27, 2008, entitled "METHOD AND APPARATUS FOR OPTIMIZING ADVANCED ENCRYPTION STANDARD (AES) ENCRYPTION AND DECRYPTION IN PARALLEL MODES OF OPERATION, now issued as U.S. Pat. No. 8,194,854.

FIELD

This disclosure relates to Advanced Encryption Standard (AES) and in particular to optimizing AES encryption/decryption.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include: (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. The AES algorithm is performed in software by executing a sequence of load/store/increment Central Processing Unit (CPU) instructions stored in a memory. The transformation is slow because the AES algorithm consumes many CPU cycles to transform each byte of plaintext or cipher text. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

AES is a block cipher that operates on a 128-bit block with a key size of 128, 192 or 256 bits. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits). A sequence of operations is iterated for each round (10, 12 or 14). The sequence of operations for an encryption round includes: (1) Adding a round key (value derived from the cipher key) to the state (a two dimensional 128-bit array of bytes) using a Exclusive OR (XOR) operation; (2) Processing the state using a non-linear byte substitution table (S-Box); (3) Cyclically shifting the last three rows of the state by different offsets; and (4) Taking all of the columns of the state and mixing their data (independently of one another) to produce new columns.

The block cipher may use one of a plurality of modes of operation. Modes of operation include Electronic Code Book (ECB), Cipher-Block Chaining (CBC), Output Feedback (OFB), Counter and Cipher-Feedback (CFB) that provide confidentiality for messages of arbitrary length. Other modes of operation such as Counter with Cipher Block Chaining-Message Authentication Code (CCM), Galois Counter Mode (GCM) and Offset Codebook Mode (OCB) ensure both confidentiality and message integrity.

In ECB mode, plaintext to be encrypted is partitioned into n-bit blocks and each block is encrypted separately, that is, blocks are encrypted independently of other blocks. In CBC mode, plaintext is processed n-bits at a time and a chaining mechanism is used to encrypt a plaintext block with the encryption of the plaintext block dependent on the encryption of a previous block. For example, the CBC mode of operation for an encryption operation may be described as shown below in Table 1:

TABLE 1

$C_{-1}$ = initialization vector (IV),
$C_j$=AES_ENCRYPT ($P_j$ XOR $C_{j-1}$) for j=1, 2, ..., number of blocks to encrypt (NB).
Where :
   $C_j$ is the ciphertext block number j, and
   $P_j$ is the plaintext block (input) number j.

In the CBC mode of operation, $C_j$ cannot be computed before $C_{j-1}$ is computed, thus the CBC mode of operation is a serial mode.

A parallel mode of operation is a mode of operation in which the encryption/decryption of one block is independent from the encryption/decryption result of other blocks. For example, the ECB and Counter modes of operation are parallel modes of operation. An example of pseudocode for an AES encryption operation using ECB mode is shown in Table 2 and an example of pseudocode for an AES encryption operation using the Counter mode of operation is shown in Table 3 below:

TABLE 2

```
for j from 1 to number of blocks to encrypt (NB)
    TargetBuffer [j] = AES_ENCRYPT_PROCEDURE
         (DataBlock[j], cipher_key)
End loop
where :
    DataBlock // buffer with NB entries of 128 bits holding the data
         to be encrypted
    TargetBuffer // buffer with NB entries of 128 bits to store the
         encrypted results (could be the same as DataBlock)
```

TABLE 3

```
Initialize COUNTER (random initialization vector (IV))
for j from 1 to number of blocks to encrypt (NB)
    Tmp1 = AES_ENCRYPT_PROCEDURE (COUNTER,
         cipher_key)
    TargetBuffer [j] = XOR (Tmp1, DataBlock[j])
End loop
where :
    DataBlock // buffer with NB entries of 128 bits holding the data
         to be encrypted
    TargetBuffer // buffer with NB entries of 128 bits to store the
         encrypted results (could be the same as DataBlock)
```

The encrypt operations (AES_ENCRYPT_PROCEDURE) in Table 2 and Table 3 may be performed in an instruction set extension for performing AES encryption and decryption in a general purpose processor. A single AES encryption operation includes a serial sequence of operations, which may be carried out via a serial sequence of AES instructions. An example of a sequence of instructions to perform encryption of a plurality of 128-bit blocks of data is shown below in Table 4:

TABLE 4

```
for (i=1; i < NB; i++)
    temp = Load (DataBlock [i])
```

TABLE 4-continued

```
    temp = xor (temp, RK[0]); // Round 0
        for(j=1; j <10; j++) // for 10 AES rounds
        temp = AESENC (temp, RK [j]);
    temp = AESENCLAST(temp, RK [10]);
    Store temp to TargetBuffer [i]
where:
    NB is the number of blocks to encrypt;
    IV is random number used to initialize the counter;
    DataBlock is a buffer to store the data to be encrypted;
    TargetBuffer is a buffer to store the encrypted results;
    RK is a buffer to store the Round keys;
    temp is a 128 bit variable.
```

The AES instructions (AESENC, AESENCLAST) shown in Table 4 process the data stored in the 128-bit variable (temp) (also referred to as the state) serially, as defined by the AES specification (FIPS Publication 197). An example of the serial sequence of operations for processing the data is shown below in Table 5.

TABLE 5

```
For i from 1 to N_BLOCKS do
    Xmm1 = BLOCK [i] // load
    Xmm1 = AESENC (Xmm1, RK [1])
    Xmm1 = AESENC (Xmm1, RK [2])
    Xmm1 = AESENC (Xmm1, RK [3])
    ...
    Xmm1 = AESENC (Xmm1, RK [9])
    Xmm1 = AESENCLAST(Xmm1, RK [10])
    store Xmm1
End
```

For each of the N_Blocks to be encrypted, the data block is stored in a register, for example, an Xmm register (Xmm1) having 128-bits may be used to store a 128-bit block. The 10 encryption rounds are performed in series on the data block. For rounds 1 through 9 of a 10 round AES operation, an AESENC instruction is called to perform the round operations using the round key and the result of the previous round or the initial block data (if round 1). The AESENCLAST instruction is called to process the last round (round 10 in this example).

If the latency of an AES round instruction (AESENC, AESENCLAST) is denoted by L processor cycles (cycles). Ignoring cycles for loading, storing and other overhead, the processing of N_BLOCKS for the 10 AES rounds shown in the example in Table 5, consumes about N_BLOCKS*10*L cycles, if processed in the order shown in Table 5. Clearly, the overall latency of performing encryption/decryption of N_Blocks depends on the latency of the individual AES instructions (AESENC, AESENCLAST).

In an embodiment of the present invention, the effect of the latency of the AES round instruction (L) is reduced, resulting in a reduction in overall latency required for performing AES encryption/decryption operation, by encrypting (decrypting) a plurality of data blocks in parallel, according to the principles of the present invention. In parallel modes of operation, different independent encryptions (decryptions) of different data blocks may be performed in parallel by dispatching an AES round instruction in every cycle, without waiting for the previous instruction to be completed.

Figure 1:
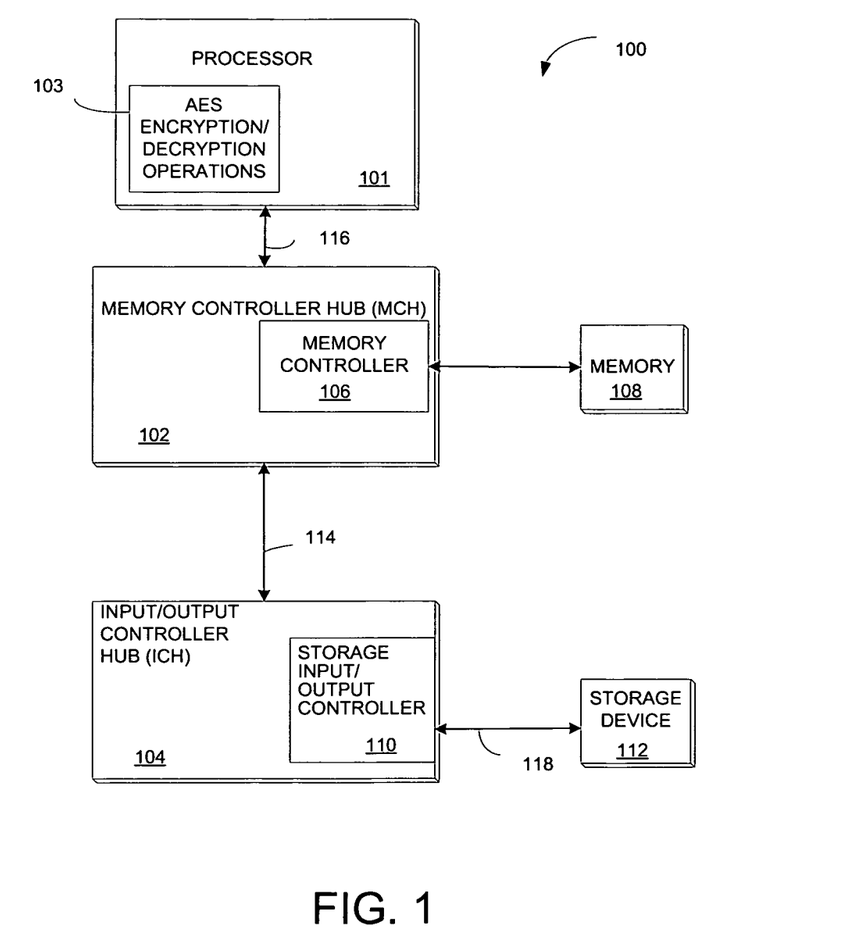
FIG. 1 is a block diagram of a system that includes instructions for performing AES encryption and decryption in a general purpose processor.

FIG. 1 is a block diagram of a system 100 that includes instructions for performing AES encryption and decryption in a general purpose processor. The system 100 includes a processor 101, a Memory Controller Hub (MCH) or (Graphics Memory Controller Hub (GMCH)) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage, protocol such as, Serial Attached Small Computer System Interface (SAS) or Serial Advanced Technology Attachment (SATA).

The processor 101 includes an AES function 103 to perform AES encryption and decryption operations. The AES function 103 may be used to encrypt or decrypt information that may be stored in memory 108 and/or stored in the storage device 112.

Figure 2:
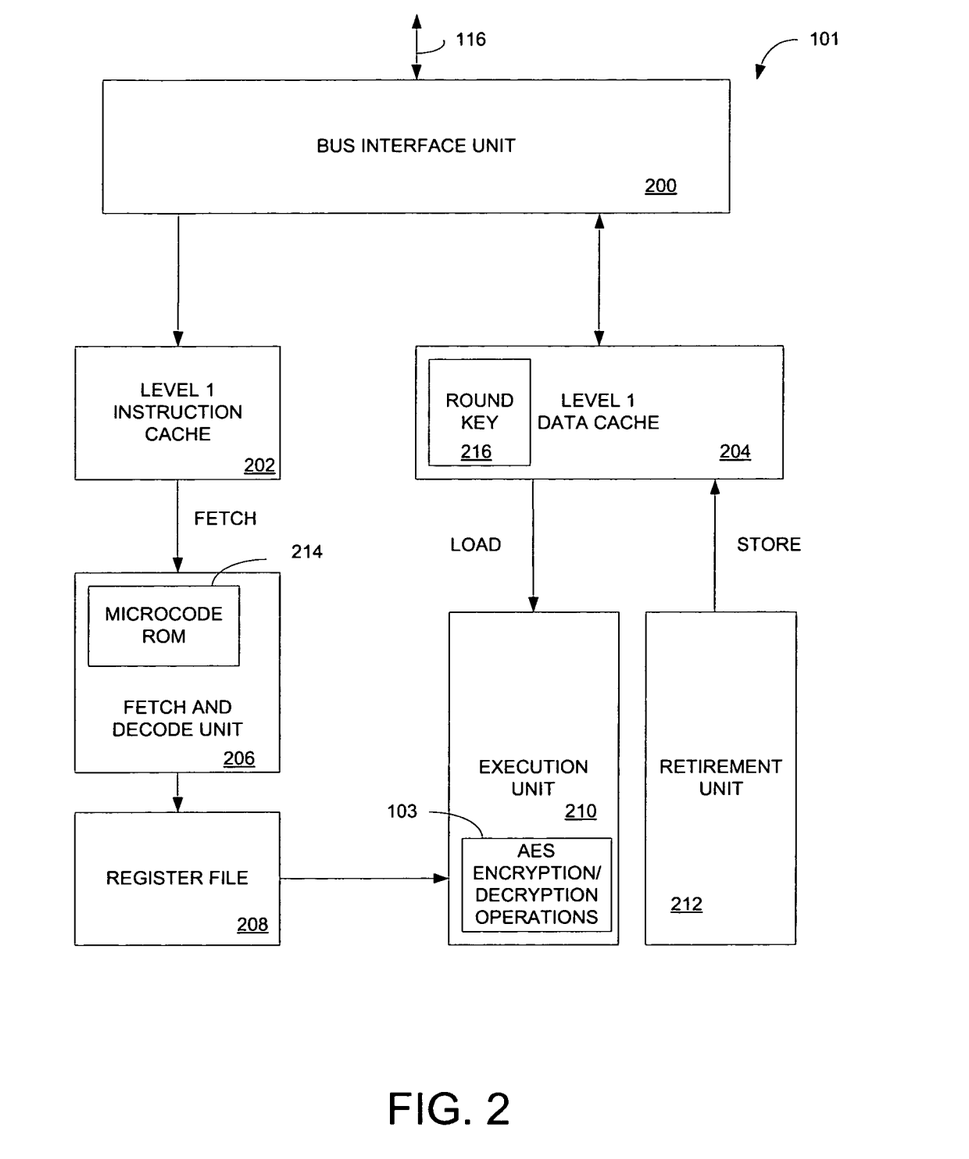
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from a Level 1 (L1) instruction cache 202. Data to be used for executing the processor instructions may be stored in a register file 208. In one embodiment, the register file 208 includes a plurality of 128-bit registers, which are used by an AES round instruction to store data for use by the AES round instruction.

In one embodiment, the register file 208 is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks with one 128-bit block loaded at one time.

The fetch and decode unit 206 fetches macroinstructions from L1 instruction cache 202, decodes the macroinstructions and breaks them into simple operations called micro operations (μtops) that may be stored in microcode Read Only Memory (ROM) 214. The execution unit 210 which is pipelined, schedules and executes the micro operations. In the embodiment shown, the AES function 103 in the execution unit 210 includes micro operations for a set of AES round instructions. The AES instructions are fully pipelined so that the processor (CPU) may dispatch an instruction in every cycle, if there is data ready to process. The retirement unit 212 writes the results of the executed instructions to registers or memory. A round key 216 used by an AES round instruction may be stored in L1 data cache 204 and loaded into the execution unit 210 for use by the micro operations to execute any of one of the AES round instructions. Storing the round key 216 in the L1 data cache 204 protects the round key 216 from side channel attacks, for example, attempts to obtain the round key in order to get access to encrypted information stored in the system 100.

After an AES round instruction has been decoded by the fetch and decode unit 206, the execution of an AES round instruction by the execution unit 210 involves performing the micro operations associated with the AES round instruction that may be stored in the microcode ROM 214.

In an embodiment, an AES instruction set is provided that includes separate AES round instructions for performing an encryption round, a decryption round, an encryption last round and a decryption last round. In an embodiment, each AES round instruction has a unique operation code (opcode). The AES round instructions in the AES instruction set for one embodiment for a fixed width round key (for example, 128-bits) are shown below in Table 6.

TABLE 6

| AESENC xmmsrcdst xmm | |
|---|---|
| Input: | data (=destination), round key |
| Output: | data after transformation through the AES round using the round key |
| AESENCLAST xmmsrcdst xmm | |
| Input: | data (=destination), round key |
| Output: | data after transformation through the AES last round using the round key |
| AESDEC xmmsrcdst xmm | |
| Input: | data (=destination), round key |
| Output: | data after transformation through the AES round using the round key |
| AESDECLAST xmmsrcdst xmm | |
| Input: | data (=destination), round key |
| Output: | data after transformation through the AES last round using the round key |

The AES instruction set includes four AES round instructions (encrypt, decrypt, encrypt last round, decrypt last round). The AES round instructions in the AES instruction set include single round operations to perform encryption and decryption round operations that are to be used for all rounds but the last round. For example, in the AESENC single round instruction in Table 6, the input data is stored in a 128-bit register (xmmsrcdst) and the round key stored in another 128-bit register (Xmm). This instruction performs an AES round operation on input data (source) that is stored in the 128-bit xmmsrcdst register and overwrites the input data stored in the 128-bit xmmsrcdst register with the result of the execution of the round operation. Thus xmmsrcdst first stores the input data and later stores the result of the AES round operation.

The size of the key may be 128-bits, 192-bits or 256-bits. The number of rounds to be performed (n) may be 1, 10, 12 or 14 dependent on the size of the key with each round key being a fixed size (128-bits). With a number of rounds value Of 10, 12, 14, the AES micro operations may perform standard AES encryption and decryption for key sizes of 128-bits, 192-bits or 256-bits.

When the same key is used for many blocks, the round key for each round (key schedule) may be pre-computed and stored in memory (for example, round key 216 in level 1 data cache 204). Round key 216 may include an array (RK) having 10 elements to store the key schedule for the key. The input key for AES-128 encryption is stored in RK[0] and the 9 round keys RK[0]–RK[1] are pre-computed.

The AES instruction set also includes an AES decryption instruction for a last decryption round and an AES encryption instruction for a last encryption round. For example, in the AESENCLAST single round instruction in Table 1, the input data is stored in a 128-bit register (xmmsrcdst) and the round key stored in another 128-bit register (Xmm). This instruction performs an AES round operation on input data (source) that is stored in the xmmsrcdst register and overwrites the input data stored in the xmmsrcdst register with the result of the execution of the round operation. Thus xmmsrcdst first stores the input data and later stores the result of the round operation. The Xmm register stores the round key for the round operation.

In an embodiment, the register file 304 has a plurality of 128-bit registers which may be used by the AES instructions. The 128-bit registers may store source operand(s), round keys and the result of an AES instruction. For the first round, the AES instruction receives a source operand that may be 128-bit of plaintext to be encrypted or 128-bits of cipher text to be decrypted.

Figure 3:
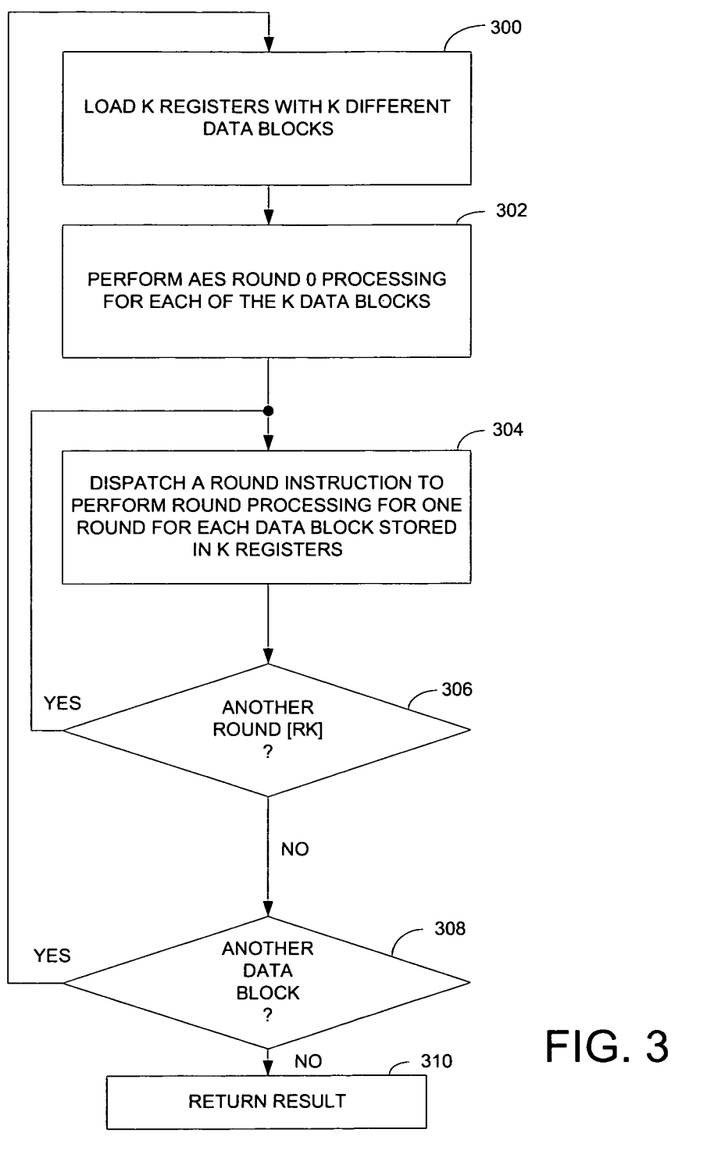
FIG. 3 is a flowgraph illustrating an embodiment of a method for improving the throughput of an AES encrypt/decrypt operation by performing independent operations on different data blocks in parallel according to the principles of the present invention.

FIG. 3 is a flowgraph illustrating an embodiment of a method for improving the throughput of an AES encrypt/decrypt operation by performing independent operations on different data blocks in parallel according to the principles of the present invention.

Throughput of the AES operation is improved by allowing the encryption/decryption flow of a data block to run in parallel with the encryption/decryption flow of another data block to provide data to process and to allow an AES round instruction to be dispatched in every cycle. Data blocks may be processed in parallel if (1) a same cipher key is used over multiple data blocks, that is, the key schedule is generated once, and multiple data blocks are processed using the same key schedule; and (2) an AES round is performed using a single fully pipelined AES round instruction. Dispatching an AES round instruction once every cycle increases throughput of an AES encryption/decryption operation even though the latency of each, AES round instruction is greater than one cycle.

An embodiment will be described for AES-128 encrypt operation, that is, for an AES encrypt operation with 10 AES rounds using a 128-bit data block and a 128-bit key.

Table 7 below illustrates an example of software instructions that may be used to maximize throughput of AES encryption by performing independent operations on different data blocks in parallel.

TABLE 7

For i from 0 to N_BLOCKS/8 −1 do
   xmm1 = BLOCK [8*i+1], xmm2 = BLOCK [8*i+2]; ...
xmm8 = BLOCK [8*i+8]
     xmm1 = AESENC (xmm1, RK [1])
     xmm2 = AESENC (xmm2, RK [1])
     xmm3 = AESENC (xmm2, RK [1])
     ...
     xmm8 = AESENC (xmm8, RK [1])
     xmm1 = AESENC (xmm1, RK [2])
     xmm2 = AESENC (xmm2, RK [2])
     ...
     xmm8 = AESENC (xmm8, RK [2])
     ...
     xmm1 = AESENCLAST(xmm1, RK [10])
     xmm2 = AESENCLAST(xmm2, RK [10])
     ...
     xmm8 = AESENCLAST(xmm8, RK [10])
     store xmm1; store xmm2; ... store xmm8
End Referring to Table 7, an AES round instruction "AESENC" is dispatched every cycle because the operations using each Xmm register are independent of the operations using the other Xmm registers. As discussed earlier, this is due to a property of the parallel mode of operation. For example, in ECB mode, plaintext to be encrypted is partitioned into n-bit blocks and each block is encrypted separately, that is, blocks are encrypted independently of other blocks. If the number of Xmm registers used (in this example, 8) is chosen to be greater or equal to the instruction latency (L), that is, number of cycles to complete the instruction, an AES round instruction can be dispatched every cycle even across the AES rounds.

At block 300, a plurality of data blocks to be encrypted/decrypted are stored in a plurality of registers (for example, a plurality of 128-bit Xmm registers). In an embodiment with 128-bit registers, as the data block size for AES is 128-bits, a different data block is stored in each of k 128-bit registers. In order to maximize performance, the number of registers used for storing the different data blocks is dependent on the latency of an AES round instruction. This allows one AES round instruction to be dispatched in every cycle so that a plurality of different data blocks may be processed in parallel. Processing continues with block 302.

At block 302, the operation performed in round 0 of AES encryption/decryption operations differs from the operation performed in the other rounds. Thus, the operation in round 0 is performed sequentially on each of the k different data blocks stored in the k 128-bit registers. Processing continues with block 304.

At block 304, the same AES round instruction is dispatched for all other rounds (for example, rounds 1 to 10 for AES-128). One AES instruction is dispatched per cycle for each of the k different data blocks stored in the k registers for the current round using the round key [RK] associated with the round. After an AES round instruction has been dispatched for each of the k different data blocks stored in the k registers, processing continues with block 306.

At block 306, if there is another round for the AES operation, processing continues with block 304 to process the next round. If not, processing continues with block 308.

At block 308, if there are other data blocks to be processed for the AES operation, processing continues with block 300 to load the k registers with the next data block(s). If not, processing continues with block 310 to return the result of the AES operation.

Figure 4:
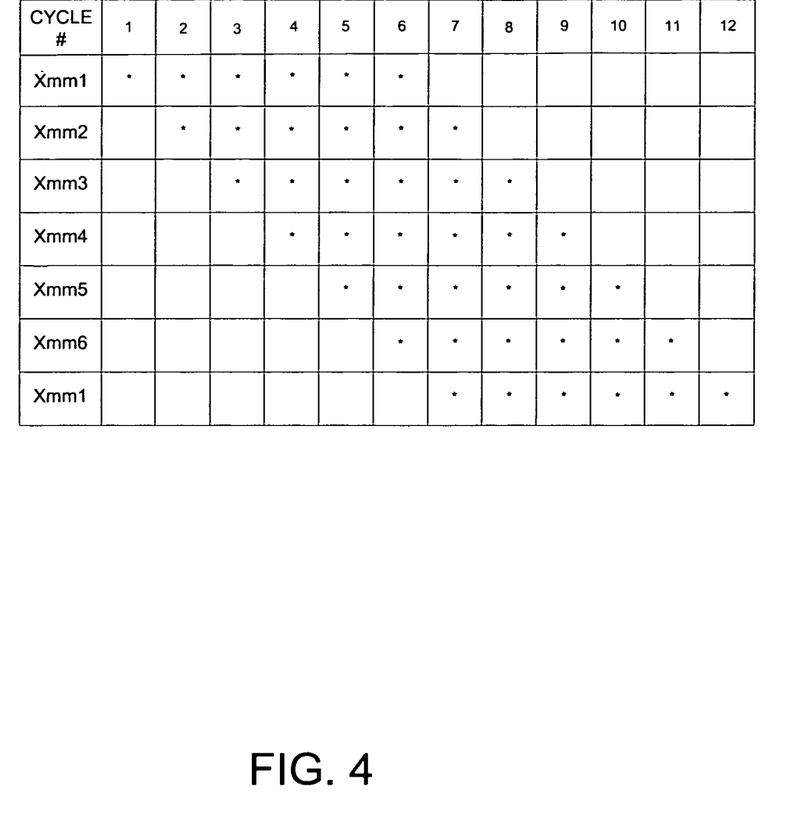
FIG. 4 illustrates an example of dispatching one AES round instruction per cycle.

FIG. 4 illustrates an example of dispatching one AES round instruction per cycle. In the example shown in FIG. 4, both the number of registers (k) and the AES round instruction latency (L) are 6. FIG. 4 illustrates the dispatch of AES instructions for one of the "for" loops shown in Table 7 and discussed in conjunction with block 304 in FIG. 3. The instructions dispatched for the 'for' loop for round 2 when k=L=6 may be written explicitly as shown below in Table 8.

TABLE 8

Xmm1 = AESENC (Xmm1, RK[1])
Xmm2 = AESENC (Xmm2, RK[1])
Xmm3 = AESENC (Xmm3, RK[1])
Xmm4 = AESENC (Xmm4, RK[1])
Xmm5 = AESENC (Xmm5, RK[1])
Xmm6 = AESENC (Xmm6, RK[1])

In this example, the registers are Xmm registers in the Xmm register file and six of the Xmm registers (labeled Xmm1–Xmm6) are used to store 6 different data blocks. However, the invention is not limited to Xmm registers, any register that can store a 128-bit data block for the AES round and is accessible by the AES round instruction may be used. An AESENC instruction can be dispatched every cycle because the operations that use Xmm1 is independent of the operations that use each of the other Xmm registers (Xmm2, ..., Xmm6). Under ideal scheduling conditions, this "for" loop takes k+L−1 (6+6−1=11) cycles to complete.

Referring to FIG. 3, an AESENC instruction is dispatched every cycle in a system in which both L and k are 6. For each round (other than round 0), the first 6 instructions operate on 6 different Xmm registers (Xmm1–Xmm6), using the same round key RK. For example, an AESENC instruction is dispatched using Xmm1 and RK[1] in cycle 1 and an AESENC instruction is dispatched in cycle 2 using Xmm2 and RK[2].

The AESENC instruction dispatched in cycle 1 has a six cycle latency and is thus completed at the end of cycle 6.

The seventh AESENC instruction that is dispatched in cycle 7 can use the seventh data block stored in the Xmm1 register with round key RK[2] because by that time, the AESENC instruction that was dispatched in cycle 1 using the first data block stored in the Xmm1 register and round key RK[1] has already completed (based on a 6 cycle latency). Thus, 6 AESENC instructions may operate independently in parallel with each one using a different data block stored in one of the six Xmm registers. Thus, the second AES round using data blocks stored in a plurality of the registers completes after a total of 11 cycles instead of after 12 cycles as would be the case if the data blocks for the two AES rounds were processed serially as discussed earlier in conjunction with the example shown in Table 5. An AESENC instruction (or AESENCLAST instruction) is dispatched in each cycle until all 10 AES rounds for the AES-128 operation are complete.

As discussed, k data blocks may be encrypted in parallel, where k is selected dependent on the number of available registers to store data blocks. If the number of registers (k)≥AES Instruction latency (L), then an AES instruction may be dispatched every cycle even "across the AES rounds", that is, all of the AES round instructions for a particular AES round do not have to be completed prior to dispatching an AES round instruction for a next AES round.

For example, if a first register is used to process AES round 1 using round key RK[1], the first register cannot be used to process AES round 2 using round key RK[2] until after k cycles have elapsed. Thus, if k≥L, there are k cycles where AES instructions are dispatched for AES round 1, and in the k+1 cycle, the first register is available for use to store a data block for AES round 2 to be processed with round key RK[2].

Processing k different data blocks in parallel requires about k cycles for AES round 0 which performs an Exclusive OR (XOR) operation plus another NR*k+L−1 cycles to process the other NR AES rounds. The throughput may therefore be estimated by (NR*k+L−1) cycles per k data blocks, which is about NR+(L−1)/k cycles per data block.

The performance is bounded by the number of available registers and by the AES round instruction latency. The round keys (RK) can be either read from memory (register-memory mode) or loaded into another register (register-register mode). Register-to-memory mode may provide higher performance if a round key is stored in first level cache after it is first read.

An implementation of AES-128 that does not use the AES round instruction consumes about 12 cycles per byte. Ignoring the latency of store/load/increment and other overheads, and assuming k=L=8, in a serial mode of operation, AES-128 (10 rounds) encryption using the AES round instruction consumes about 10*L cycles per 128 bits (16 bytes), that is, about 5 cycles/byte. By processing a plurality of different data blocks in parallel, as discussed earlier, the encryption of 8 blocks consumes NR*k+L−1, that is, about 72 cycles per 8 blocks (0.56 cycles/byte). Thus, performing independent operations on different data blocks in parallel achieves a performance increase that is almost nine times greater than when using the serial sequence of operations for processing the data as discussed in conjunction with Table 5.

By performing operations in parallel, the latency (L) of the AES round instruction is "hidden" as long as the number of registers (k) is greater or equal to L. This allows efficient use of the AES round instructions for encryption/decryption for AES operations that use a mode of operation that operates on a block independently of other blocks, for example, mode of operations including ECB, CCM, GCM and counter.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method of performing an Advanced Encryption Standard (AES) operation on a plurality of fixed size data blocks using a mode of operation that operates on a block independently of other blocks, comprising:

storing, by a processor, a set of k consecutive data blocks of the plurality of fixed sized data blocks in k registers, k greater or equal to the latency (L) of an AES round instruction, the AES round instruction to perform a sequence of AES round operations for an AES round on the set of k consecutive data blocks; and performing, by one or more processors, the sequence of AES round operations on the set of k consecutive data blocks in parallel during the AES round by dispatching the AES round instruction to each of the set of k consecutive data blocks in a pipelined fashion at a rate of one data block per processor cycle.

2. The method of claim 1, further comprising storing the result of the AES round instruction for each of the k blocks in one of the k registers.

3. The method of claim 1, wherein each of the data blocks has 128 bits.

4. The method of claim 1, wherein each of the registers is an Xmm register.

5. The method of claim 1, wherein the mode of operation is one of Electronic Code Book (ECB), counter, Cipher Block Chaining Message Authentication Code (CCM), and Galois Counter Mode (GCM).

6. The method of claim 1, wherein k>2 and L>2.

7. The method of claim 6, wherein k is equal to 6 and L is equal to or smaller than k.

8. The method of claim 6, wherein k and L are equal to each other and equal to 8.

9. A non-transitory computer-readable medium including a computer readable code stored thereon having associated information, wherein the information, when accessed, results in a machine to perform an Advanced Encryption Standard (AES) operation on a plurality of fixed size data blocks using a mode of operation that operates on a block independently of other blocks that comprises:

storing a set of k consecutive data blocks of the plurality of fixed sized data blocks in k registers, k greater or equal to the latency (L) of an AES round instruction, the AES round instruction to perform a sequence of AES round operations for an AES round on the set of k consecutive data blocks; and performing the sequence of AES round operations on the set of k consecutive data blocks in parallel during the AES round by dispatching the AES round instruction to each of the set of k consecutive data blocks in a pipelined fashion at a rate of one data block per processor cycle.

10. The non-transitory computer-readable medium of claim 9, further comprising storing the result of the AES round instruction for each of the k blocks in one of the k registers.

11. The non-transitory computer-readable medium of claim 9, wherein each of the data blocks has 128 bits.

12. The non-transitory computer-readable medium of claim 9, wherein each of the registers is an Xmm register.

13. The non-transitory computer-readable of claim 9, wherein the mode of operation is one of Electronic Code Book (ECB), counter, Cipher Block Chaining Message Authentication Code (CCM), and Galois Counter Mode (GCM).

14. The non-transitory computer-readable medium of claim 9, wherein k>2 and L>2.

15. An encryption apparatus, comprising:
a register file to store a set of k consecutive data blocks of the plurality of fixed sized data blocks in k registers, k greater or equal to the latency (L) of an Advanced Encryption Standard (AES) round instruction, the AES round instruction to perform a sequence of AES round operations for an AES round on the set of k consecutive data blocks; and an execution unit within a processor to perform an AES operation on the plurality of fixed size data blocks using a mode of operation that operates on a block independently of other blocks, the execution unit within the processor to perform the sequence of AES round operations on the set of k consecutive data blocks in parallel during the AES round by dispatching the AES round instruction to each of the set of k consecutive data blocks in a pipelined fashion at a rate of one data block per processor cycle.

16. The apparatus of claim 15, wherein the execution unit stores the result of the AES round instruction for each of the k blocks in one of the k registers.

17. The apparatus of claim 15, wherein each of the data blocks has 128 bits.

18. The apparatus of claim 15, wherein each of the registers is an Xmm register.

19. The apparatus of claim 15, wherein the mode of operation is one of Electronic Code Book (ECB), counter, Cipher Block Chaining Message Authentication Code (CCM), and Galois Counter Mode (GCM).

20. The apparatus of claim 15, wherein k>2 and L>2.

* * * * *